United States Patent
Benning et al.

(10) Patent No.: US 7,042,614 B1
(45) Date of Patent: May 9, 2006

(54) SPATIAL LIGHT MODULATOR

(75) Inventors: Paul Benning, Corvallis, OR (US); Kenneth James Faase, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/990,797

(22) Filed: Nov. 17, 2004

(51) Int. Cl.
*G02F 1/00* (2006.01)
*G02F 1/03* (2006.01)
*G02F 1/135* (2006.01)

(52) U.S. Cl. ............... 359/253; 359/245; 359/254; 359/259; 359/237; 349/25

(58) Field of Classification Search .......... 359/237, 359/245, 252–254, 259; 349/24, 25
See application file for complete search history.

(56) References Cited

U.S. PATENT DOCUMENTS

| | | | |
|---|---|---|---|
| 6,545,797 B1 | 4/2003 | Chen et al. | |
| 6,672,921 B1 | 1/2004 | Liang et al. | |
| 2002/0155372 A1 | 10/2002 | Liang | |
| 2002/0176963 A1 | 11/2002 | Chen et al. | |
| 2002/0182544 A1 | 12/2002 | Chan-Park et al. | |
| 2002/0188053 A1 | 12/2002 | Zang et al. | |
| 2002/0196525 A1 | 12/2002 | Chen et al. | |
| 2003/0142901 A1 | 7/2003 | Lahann et al. | |
| 2003/0203101 A1 | 10/2003 | Haubrich et al. | |

OTHER PUBLICATIONS

Malakoff, David, "Researchers Urged to Self-Censor Sensitive Data", *Science, vol. 299*, www.sciencemag.org,(Jan. 17, 2003),321 and 323.

*Primary Examiner*—Loha Ben
*Assistant Examiner*—Jack Dinh

(57) ABSTRACT

A spatial light modulator includes a first portion and a second portion. Both the first portion and the second portion include a planar electrode, a polar solvent, and a non-polar solvent. The polar solvent and the non-polar solvent are supported by the first planar electrode. A coating of molecules is attached to the first planar electrode and includes a head end. The head end changes between a first shape and a second shape.

26 Claims, 6 Drawing Sheets

SPATIAL LIGHT MODULATOR

BACKGROUND

Displays are used in televisions and computers. Projectors are most commonly used in televisions. Display types include cathode ray tubes (CRTs) and liquid crystal displays (LCDs). CRTs use electron beam technology that has been present for many years in consumer products such as television (TV) tubes and computer monitors. CRTs use hot cathode electrodes to create a source of electrons that are directed to and focused on the viewing screen. The viewing screen generally includes glass. Directing the electrons to the viewing screen requires some distance. In addition, the viewing screen is generally made of glass, so CRTs are heavy, especially in larger displays or monitors. Consequently, CRTs are heavy and use a relatively large space when compared to LCD monitors.

LCD monitors are lightweight and thin in comparison to CRTs. An LCD may use two pieces of polarized glass. A special polymer is dispensed on a side of the glass that does not have a polarizing film on it. A special polymer creates microscopic grooves in the glass surface to form a first light filter. The grooves are in the same direction as the polarizing film. The grooves are coated with pneumatic liquid crystals to finish a light filter. The grooves cause the first layer of molecules to align with the filter's orientation. The second piece of polarized glass is supported by the first piece of polarized glass at a right angle. Each successive layer of molecules gradually twists until the uppermost layer or portion of the molecule is at a 90-degree angle to the bottom layer or portion. The twisted molecules, therefore, act as light guides that twist to match the polarized glass filters.

As light strikes the first filter, it is polarized. The molecules in each layer then guide the light they receive to the next layer. As the light passes through the liquid crystal layers, the molecules also change the light's plane of vibration to match their own angle. When the light reaches the far side of the liquid crystal substance, it vibrates at the same angle as the final layer of molecules. If the final layer is matched up with the second polarized glass filter, then the light may pass through.

Applying an electric charge to the liquid crystal molecules causes the molecules to straighten out or untwist. When they straighten out, they change the angle of the light passing through them so that it no longer matches the angle of the top polarizing filter. Consequently, no light can pass through that "charged" area of the LCD, which makes that area darker than the surrounding areas. LCDs switch pixels through polarization.

SUMMARY

A spatial light modulator includes a first portion and a second portion. Both the first portion and the second portion include a planar electrode, a polar solvent, and a non-polar solvent. The polar solvent and the non-polar solvent cover the first planar electrode. A coating of molecules is attached to the first planar electrode. At least some of the molecule have an attached end and a free end. The free end of the molecules change between a first shape and a second shape.

DETAILED DESCRIPTION

In the following description, the drawings illustrate specific embodiments sufficiently to enable those skilled in the art to practice it. Other embodiments may incorporate structural, logical, electrical, process, and other changes. Examples merely typify possible variations. Individual components and functions are optional, and the sequence of operations may vary. Portions and features of some embodiments may be included in or substituted for those of others. The scope encompasses the full ambit of the claims and all available equivalents. The following description is, therefore, not to be taken in a limited sense, and the scope of the embodiments is defined by the appended claims.

Figure 1:
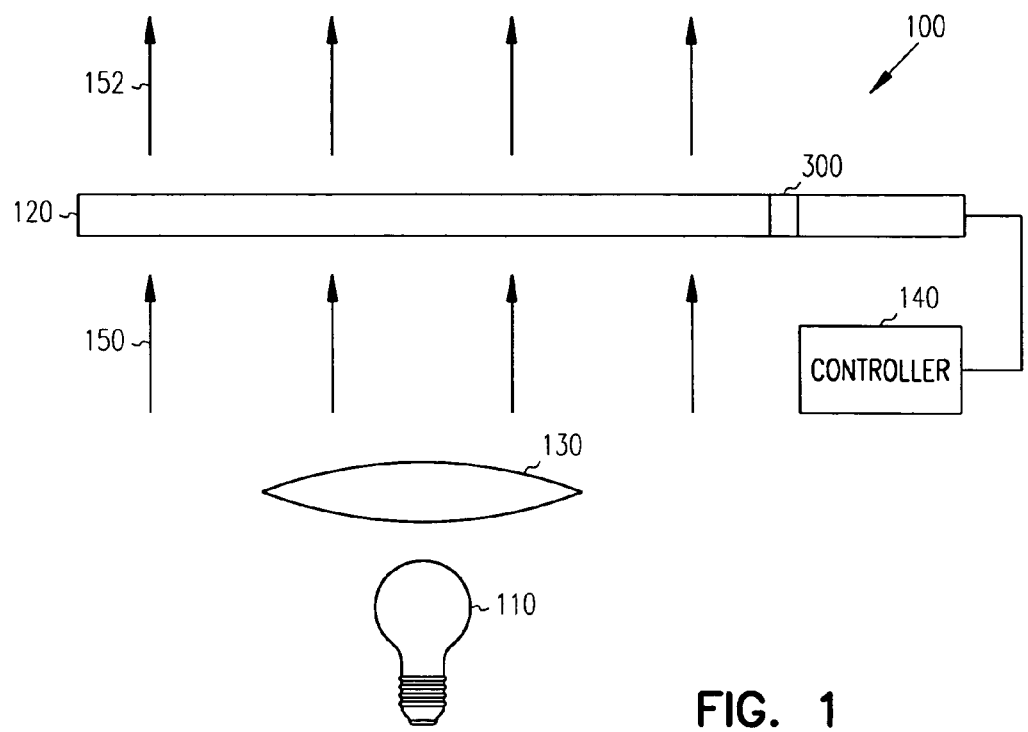
FIG. 1 is a schematic diagram of a display device, according to an example embodiment.

FIG. 1 is a schematic diagram of a display device 100, according to an example embodiment. The display device 100 includes a light source 110, a spatial light modulator 120, and optics 130 for directing light from the light source 110 toward the spatial light modulator 120. The spatial light modulator 120 includes at least one cell 300. The spatial light modulator 120 can include one cell or can include a plurality of cells 300. In some embodiments, each of the cells 300 corresponds to a pixel on the display device 100. Attached to the spatial light modulator 120 is a controller 140. The controller 140 receives image information for the spatial light modulator 120 and controls the spatial light modulator to produce an image or series of images. The controller 140 controls at least one cell 300 of the spatial light modulator 120. In another embodiment, the controller 140 controls a plurality or multiplicity of cells 300 associated with the spatial light modulator 120 in order to produce an image. In the embodiments where there is a plurality or multiplicity of cells or pixels 300, the cells or pixels 300 are individually connected to the controller 140. Each cell or pixel 300 can be individually addressed or controlled in order to produce a desired image. The controller 140 may include a dedicated controller, a microprocessor or a computer that includes memory, inputs and outputs, and a user interface. The controller may include one or a combination of the above. As shown in FIG. 1, white light, as depicted by reference numeral 150, is transmitted to the spatial light modulator 120, passes through the spatial light modulator 120 and exits as filtered light 152. The spatial light modulator 120 may be read directly, therefore be an active display or the display device 100 can be provided with a screen onto which the filtered light 152 is projected. In this latter embodiment, the display device is a projection device. The screen is not shown in FIG. 1.

Figure 2:
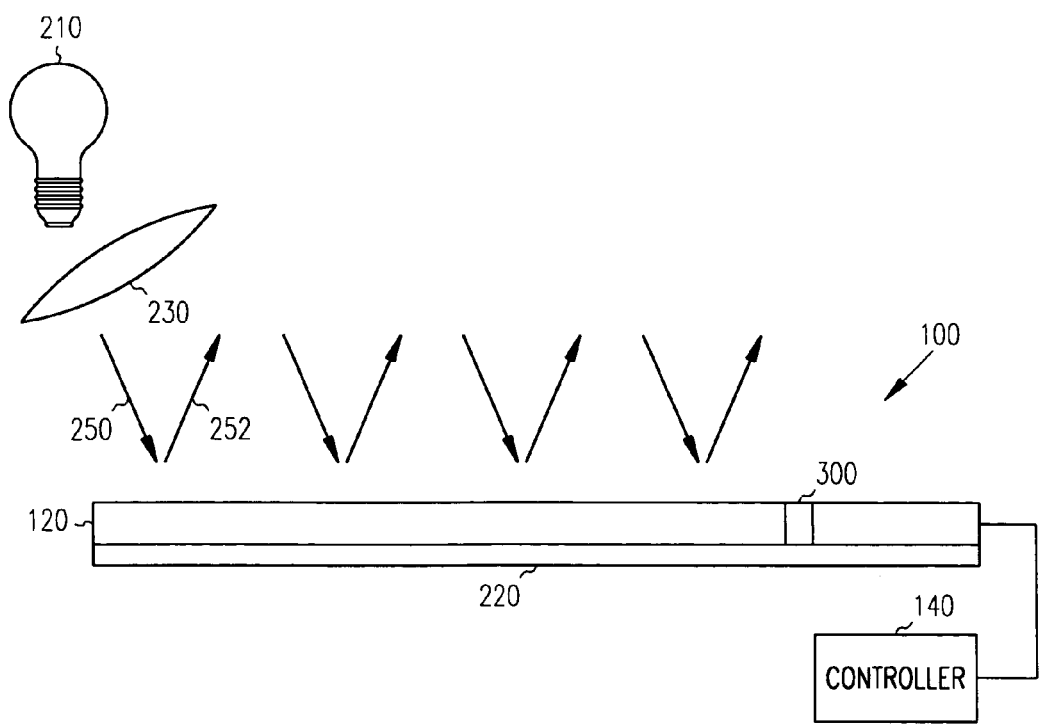
FIG. 2 is a schematic diagram of a display device, according to an example embodiment.

FIG. 2 is a schematic diagram of a display device 200, according to an example embodiment. The display device 200 includes a light source 210, optics 230, and a spatial light modulator 120. The spatial light modulator 120 includes a reflector or reflective surface 220 which is attached or placed adjacent the spatial light modulator 120. The optics 230 direct white, incident light 250 toward the spatial light modulator 120. The light is transmitted through the spatial light modulator 120 to the reflector or reflective surface 220 and then is reflected as filtered light 252 from the spatial light modulator 120. The spatial light modulator 120 also includes at least one cell 300 or pixel. In some embodiments, the spatial light modulator 120 includes a plurality or multiplicity of cells or pixels 300. A controller 140 is also attached to the spatial light modulator 120. Specifically, the controller receives image information and outputs it to the spatial light modulator 120 so that images are produced on the spatial light modulator. More specifically, the controller 140 is connected to one or more of the cells or pixels. The controller 140 controls the individual cells or pixels to produce a desired image which can be either viewed directly by looking at the surface of the spatial light modulator 120 or projected onto a screen (not shown). It should be noted that the spatial light modulator 120 can be made up of a single cell 300 or a multiplicity or plurality of cells 300. In another example embodiment of the display device 200, ambient light is substituted for the light source 210. In other words, there is no integrated light source and the reflected light is ambient light.

Figure 3:
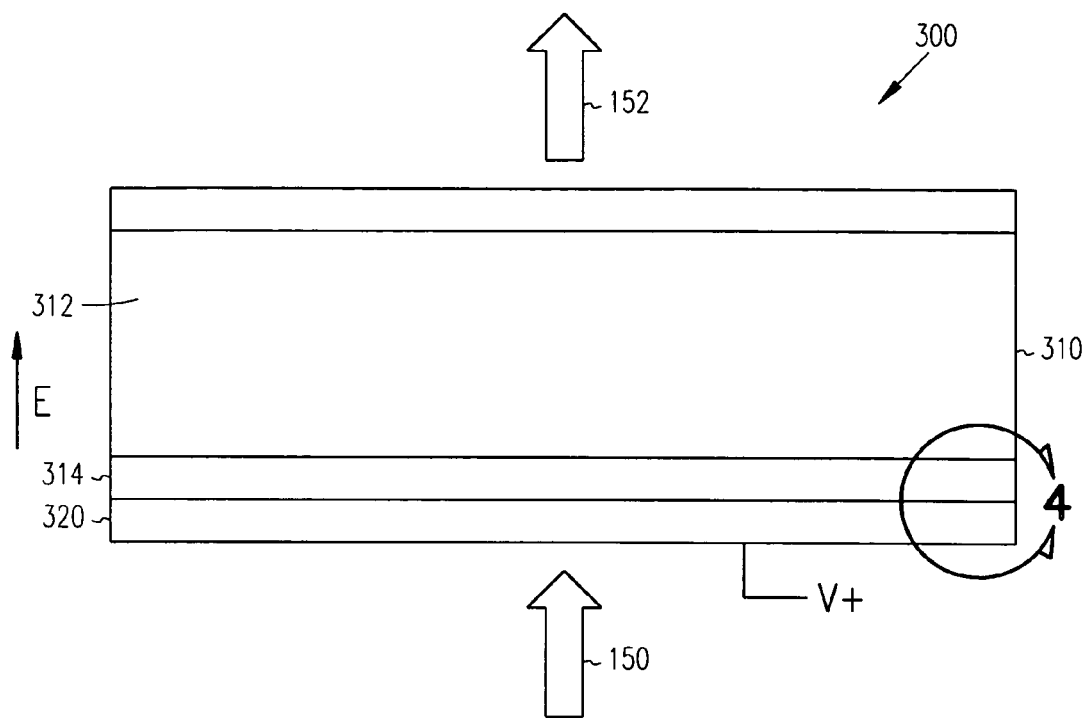
FIG. 3 is a schematic diagram of a cell of a spatial light generator, according to an example embodiment.

FIG. 3 is a schematic diagram of a cell 300 of a spatial light generator 120 (shown in FIGS. 1 and 2), according to an example embodiment. The cell 300 includes a housing 310 and an electrode 320. As shown in FIG. 3, the electrode 320 is planar. A planar electrode 320 is covered by or supports a polar solvent 312 and a non-polar solvent 314. The polar solvent 312 and the non-polar solvent 314 are immiscible fluids. One of the non-polar solvent 314 or the polar solvent 312 is provided with a colorant. In the example shown in FIG. 3, the non-polar solvent 314 contains the colorant. As shown in FIG. 3, white light 150 is transmitted through the cell 300 and emerges as filtered light 152. Therefore the example shown is a cell 300 from FIG. 1. It should be noted that the cell 300 in FIG. 2 works in the same way as described below. The light output in FIG. 2 is reflected light rather than transmitted light.

Figure 4:
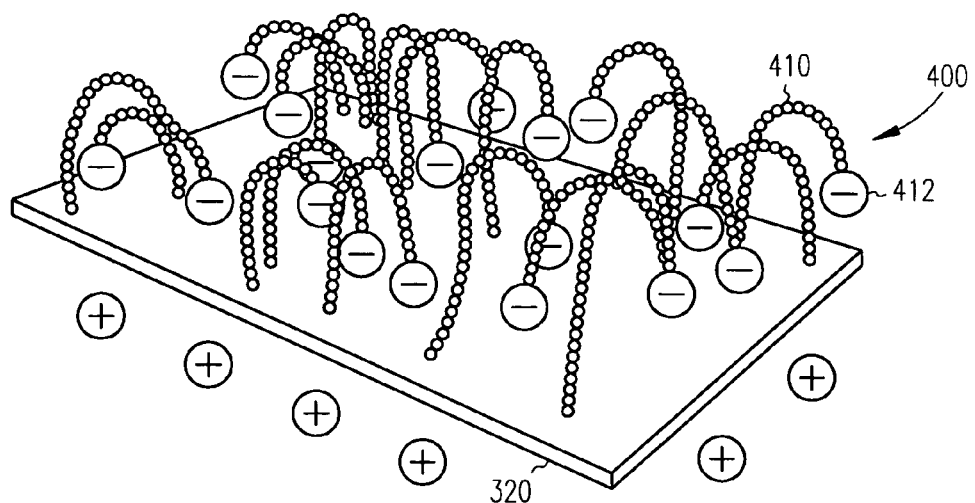
FIG. 4 is a schematic diagram showing a monolayer of molecules attached to an electrode of a cell of a spatial light generator with the molecules in a first orientation, according to an example embodiment.

FIG. 4 is a schematic diagram showing a coating of molecules, such as a monolayer of molecules 400 attached to the electrode 320 of a cell 300 with the monolayer of molecules 400 in a first conformation or orientation, according to an example embodiment. The molecules in the monolayer of molecules 400 include a tether 410 and a free end 412. As shown in FIG. 4, the free end 412 carries a charge or includes a polarized group. Therefore, when the planar electrode 320 is positively charged or when a positive potential is applied to the electrode 320, the negatively charged heads at the free ends 412 are attracted to the oppositely charged electrode 320. The tethers 410 of the molecules 400 bend to allow the negatively charged heads or free ends 412 to be more closely positioned to the positively charged electrode 320. Now referring to both FIGS. 3 and 4, as the tethers bend, a hydrophobic alkyl chain is exposed thereby creating a hydrophobic surface at or substantially near the surface of the electrode 320. The hydrophobic surface causes the non-polar, colorant containing solvent 314 to spread out across the electrode 320. When the colorant containing non-polar solvent 314 spreads out across the planar electrode 320, the colorized, non-polar solvent 314 is interposed in to the light path of the cell 300. The light path corresponds to the light path depicted by the two arrows 150, 152 in FIG. 3. In other words, the dyed or pigment-containing (colorized) non-polar solvent 314 is placed in a filtering position across the planar electrode 320 of the cell 300, as shown in FIG. 3. FIG. 3 shows a transmissive type of cell 300. Therefore, incident white light 150 directed toward the cell 300 passes through the cell and passes through the dyed or pigment-containing (colorized) non-polar solvent 314 and exits the cell as filtered light 152.

It should be noted that in the example shown in FIGS. 3–6, a transmissive spatial light modulator 120, such as the one shown in FIG. 1, is shown. It should be understood that the same cell 300 discussed in FIGS. 3–6 could also be used in a reflective type of spatial light modulator 120, such as the one shown in FIG. 2.

Figure 5:
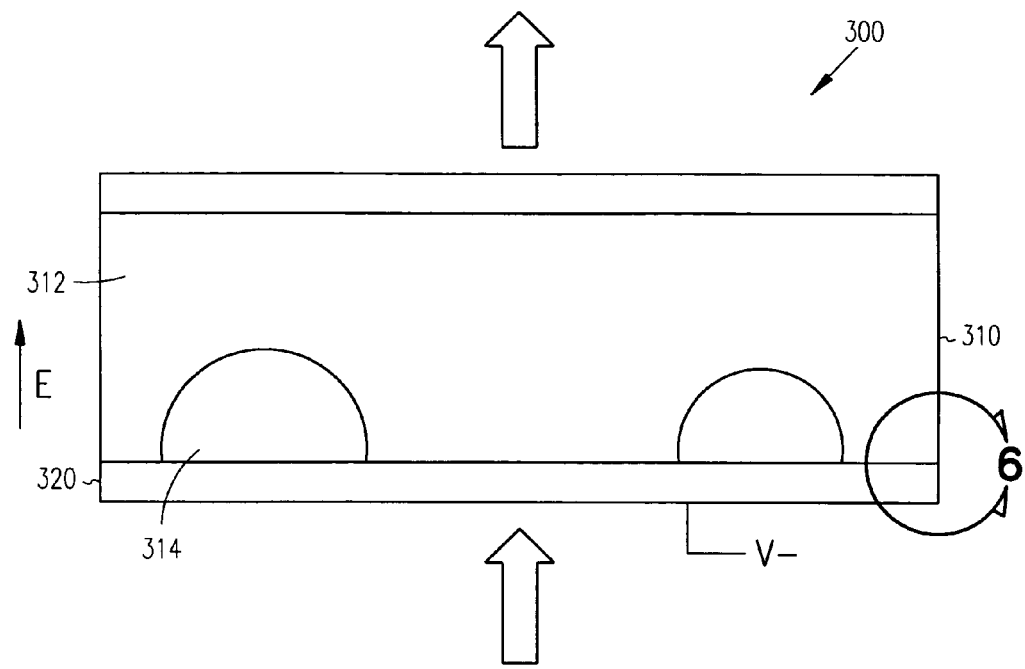
FIG. 5 is a schematic diagram showing a monolayer of molecules attached to an electrode of a cell of a spatial light generator with the molecules in a second orientation, according to an example embodiment.
Figure 6:
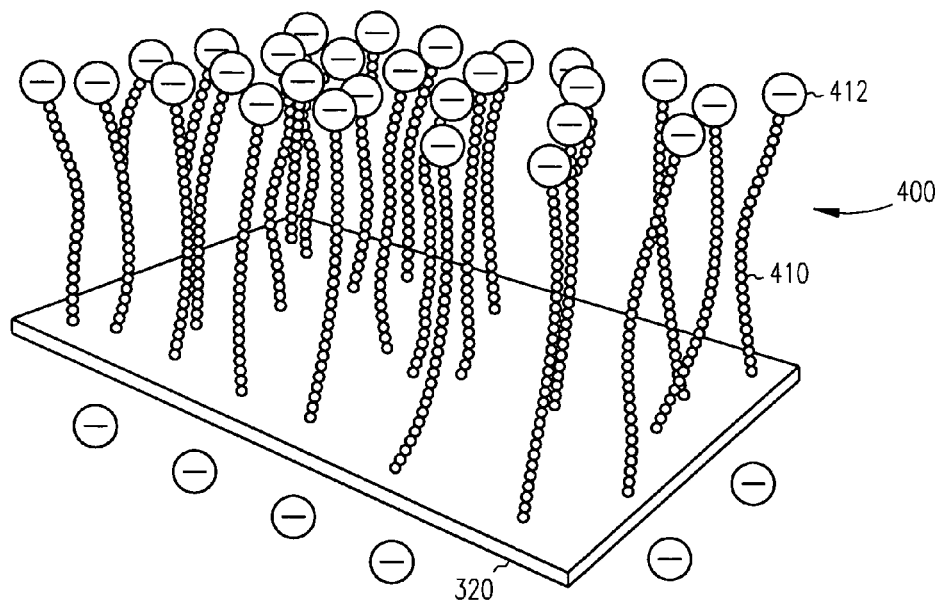
FIG. 6 is a schematic diagram of a cell of a spatial light generator with the monolayer of molecules in the second orientation, according to an example embodiment.

FIGS. 5 and 6 will now be discussed. FIG. 5 is a schematic diagram showing a monolayer of molecules 400 attached to an electrode 320 of a cell 300 of a spatial light generator with the molecules in a second orientation or confirmation, according to an example embodiment. FIG. 6 is a schematic diagram of a monolayer of molecules attached to a planar electrode 320 of a cell 300 of a spatial light generator with the molecules in a second orientation or confirmation, according to an embodiment. As shown in FIGS. 5 and 6, a negative charge or voltage is placed on the electrode 320. The negatively charged heads or free ends 412 of molecules of the molecular monolayer 400 are repelled by the negatively charged planar electrode 320. The negatively charged heads or ends 412 of the molecules 400 are then in a position or present a surface which is hydrophilic. This causes the polar solvent 312 to wet to the surface or free ends 412 of the monolayer of molecules 400, and specifically to the monolayer of molecules 400 attached to the planar electrode 320 by the tethers 410. When the polar solvent 312 wets to the surface of the molecular monolayer 400 attached to the planar electrode 320, the non-polar solvent 314, which includes the colorant, is concentrated or balls up. This reduces the cross-sectional area of the colorized non-polar solvent 314. The reduced cross-sectional area of the non-polar solvent 314 allows most of the incident light 150 traveling through the cell 300 to pass through the cell 300 substantially unfiltered. Of course, some of the light is transmitted through some of the concentrated colorant containing non-polar solvent. However, most of the light traveling through the substantially transparent cell continues unfiltered through the cell 300.

It should be noted that in the example discussed, the non-polar solvent 314 includes the colorant. The polar portion of the solvent 312 could also be provided with the colorant with similar results. The amount of colorant that is placed into either the polar or non-polar solvent is sufficient to filter the light when the colorized portion of either the non-polar solvent 314 or the polar solvent 312 is distributed across the cell or over the planar electrode 120. The polar solvent and the non-polar solvent are immiscible. Therefore, the polar solvent 312 does not mix with the non-polar solvent 314. Any number of solvents may be used. Water is one common polar solvent that may be used.

In one embodiment, the molecules of the monolayer of molecules 400 include chainlike polymers called alkanethiols, which naturally assemble into what looks like rows of tightly packed miniature cornstalks. The chain-like polymers act as tethers 410. The molecules of the monolayer of molecules 400 include synthesized alkanethiols with different chemical properties on their tops and sides which are attached to the planar electrode 320. In one embodiment, sulfur atoms are placed on one end of the alkanethiols. The sulfur atoms at one end of the molecules 400 bind to a gold surface on the electrode 320. The molecular stalks or tethers 410 have little choice but to stand straight up if packed in densely enough. To bend over, however, the alkanethiols use additional space. Initially, the alkanethiol stalks 410 are synthesized with bulky mushroom-like heads 412. A solution of them is poured over a gold plate. The molecules 400, named (16-mercapto) hexade-canoic acid (2-chlorophenyl) diphenyl-methyl ester, or MHAE, latch onto the gold surface. The bulky headgroups 412 prevent them from packing tightly together. Then hydrolysis is used to lop off the tops of the mushrooms or from a smaller head 412 on each tether 410. Hydrolysis leaves each molecular cornstalk or tether 410 tipped with a negatively charged, water-loving carboxylic acid group 412.

The surface wettability of the planar electrode 320 exploits conformational transitions (switching) of the molecules above confined as a low-density film on the surface of the electrode 320 (FIGS. 3–6). The films discussed herein are based on a dual conformation system and are, in one embodiment, nanolayers or monolayers. The two conformation states, shown in FIGS. 3–6, of the nanolayer or monolayer film provide different surface properties to the surface of the electrode 320 on which the film is deposited. Switching between the two different states changes the surface wettability of the electrode 320. When a stimulus is applied to the film, the conformation state changes, and thereby causes the surface properties to switch. A large number of molecular assemblies amplify a microscopic effect into a macroscopic surface chemistry. Each molecular assembly includes a tether 410, an active group (charged head end 412), and at least two information carriers. The tether 410 establishes the conformation of the molecular assembly and enables each assembly to achieve a conformation consistent with that of other assemblies in the film. The active group (head end 412) interacts with an external stimulus (charge on electrode 320) to change the conformation of the tether 410 and thus the conformation of the molecular assembly 400. The information carriers determine the surface properties of the substrate for each conformation of the tether.

In some embodiments, the molecules of the monolayer of molecules 400 may include an anchor that retains the assembly on the substrate. One molecular group may serve more than one role in the molecular assembly 400. For example, in the single chain molecular assembly 410 (shown in FIGS. 4 and 6), the chain 410 tethers the monolayer of molecules 400 to the electrode 320 and also includes the information carrier, a hydrophobic group, for one of the conformations. The charged group at the free end 412 of the assembly 400 is the second information carrier and also interacts with the external stimulus, in this case, an electrical charge on the electrode 320. Another group anchors the monolayer of molecules 400 to the electrode 320.

The surface properties that may be switched using the methods disclosed herein include any surface property. FIGS. 3–6 illustrate a change in hydrophobicity or hydrophilicity. These changes, in turn, change the surface wettability of the electrode 320. The film including the monolayer of molecules 400 can be used in a variety of cells 300. The cells 300 can include liquids or gases, or other materials.

In an embodiment, any substrate, including all classes of materials such as metals, ceramics, glasses, non-crystalline materials, semiconductors, polymers and composites, can be used or adapted for use herein. Substrates may also be combined. For example, a substrate of one material may be coated or patterned with a second material. Such coatings may be desirable to provide a specifically tailored set of bulk and surface properties for the substrate. Exemplary deposition techniques for such coatings include chemical vapor deposition (CVD), metal oxide CVD, sputtering, sol-gel techniques, evaporation, pulsed laser deposition, ion beam assisted deposition, and CVD polymerization. It is not necessary to coat the entire substrate with the second material. The second material may be deposited according to a periodic or other pattern. For example, an electrical circuit may be deposited on the material. The substrates may also be pretreated before deposition of the molecular assemblies. A range of methods are known in the art that can be used to charge, oxidize, or otherwise modify the composition of a surface if desired, including but not limited to plasma processing, corona processing, flame processing, and chemical processing, e.g., etching, microcontact printing, and chemical modification. Optical methods, such as UV or other high energy electromagnetic radiation or electron beams, may also be employed.

Films including the monolayer of molecules 400 can be deposited on a surface, such as the electrode 320, using a variety of techniques. For example, the any of the deposition techniques described above may be used to form the films herein. In addition, any thin film deposition technique can be used to apply the films containing the monolayer of molecules 400. The films may be easily patterned on a surface using photolithographic or lithographic techniques. For instance, inkjet printing and automated (robotic) techniques can precisely deposit small spots of material containing the monolayer of molecules 400 on a portion of the electrode 320.

In one embodiment, the tether 410 may include an anchor group that facilitates molecular self assembly. Anchor groups form chemical bonds with functional groups on the surface of the electrode 320 to form a self assembled monolayer (SAM). SAMs having different anchor groups, such as silane and thiol can be deposited on a wide variety of electrodes 320. SAMs may be deposited from both the solution and the gas phases onto the substrate.

Single chain molecular assemblies may be used in both dense and low-density nanolayers to tailor the surface properties of a substrate. Spontaneous self-assembly allows free energy considerations to determine the distance between individual molecular assemblies. Favorable interactions between tethers, for example, non-covalent interactions, may lead to densely packed SAMs. As discussed below, the assemblies in such monolayers are typically too closely packed to undergo the change in conformation shown in FIGS. 2 and 4.

Low density nanolayers of single chain molecular assemblies 400 can be produced by temporarily attaching a bulky endgroup to the assembly, as shown in FIGS. 2 and 4. Cl-triphenyl ester group on the free or head end 412 increases the effective size of the assembly 400, causing the SAM to form with a larger inter-assembly spacing. The triphenylmethyl group is easily hydrolyzed to leave a low-density carboxyl terminated SAM. Other bulky molecular groups, such as tert-butyl and isopropyl, may be used as well. End groups on the free or head end 412 used herein may be easily cleavable from the molecular assembly without affecting the chemical and mechanical stability of the monolayer. The size for the endgroup may be defined in part by the application for the molecular monolayer 400. For example, different active groups at the head end 412 may use different areas for energetically favorable conformational changes.

In other embodiments, alternative methods besides bulky endgroups or head ends 412 can be used to control the density of a nanolayer on the substrate surface. For example, two different molecules, a long chain molecule and a short bulky molecule may be co-deposited in a single monolayer or nanolayer.

In one embodiment, straight chain tethers 410 have between 5 and 30 carbons. The carbon chains of the tethers 410 may be long enough to bend over, but not so long that solvent interactions with either the active group or the tether dominate the energetic considerations leading to a transition between the extended and bent conformations. However, it is not necessary that the chain be a hydrocarbon. A polar or other functional group may be disposed in the middle of the chain. For example, rigid chemical groups such as double and triple bonds, aromatic, polyaromatic, polycyclic, and fused aromatic groups may be incorporated into the tether 410. These groups stiffen the monolayer of molecules 400 in the upright conformation and help dictate the conformation of the assembly when it bends.

In other embodiments, it may be desirable to fabricate a nanolayer that is more geometrically stable with respect to both chemical and physical environmental influences. Thus, a nanolayer with a more rigid tether than the long chain hydrocarbons described above might be used.

Several techniques may be used to switch the properties of the thin film having the monolayer of molecules 400. For example, the monolayer of molecules 400 with a charged active group exhibits one conformation when the substrate is neutral and a second conformation when a voltage is applied to the substrate, as shown in FIGS. 3–6. If a non-conductive substrate or electrode 320 is used, the substrate may be charged by applying a charge across the substrate 320 and allowing it to charge as if it were a capacitor. A charged or polar active group may still be able to interact with the substrate via electrostatic interactions, and discharge of the capacitor releases the active group and permits a change in conformation.

Figure 7:
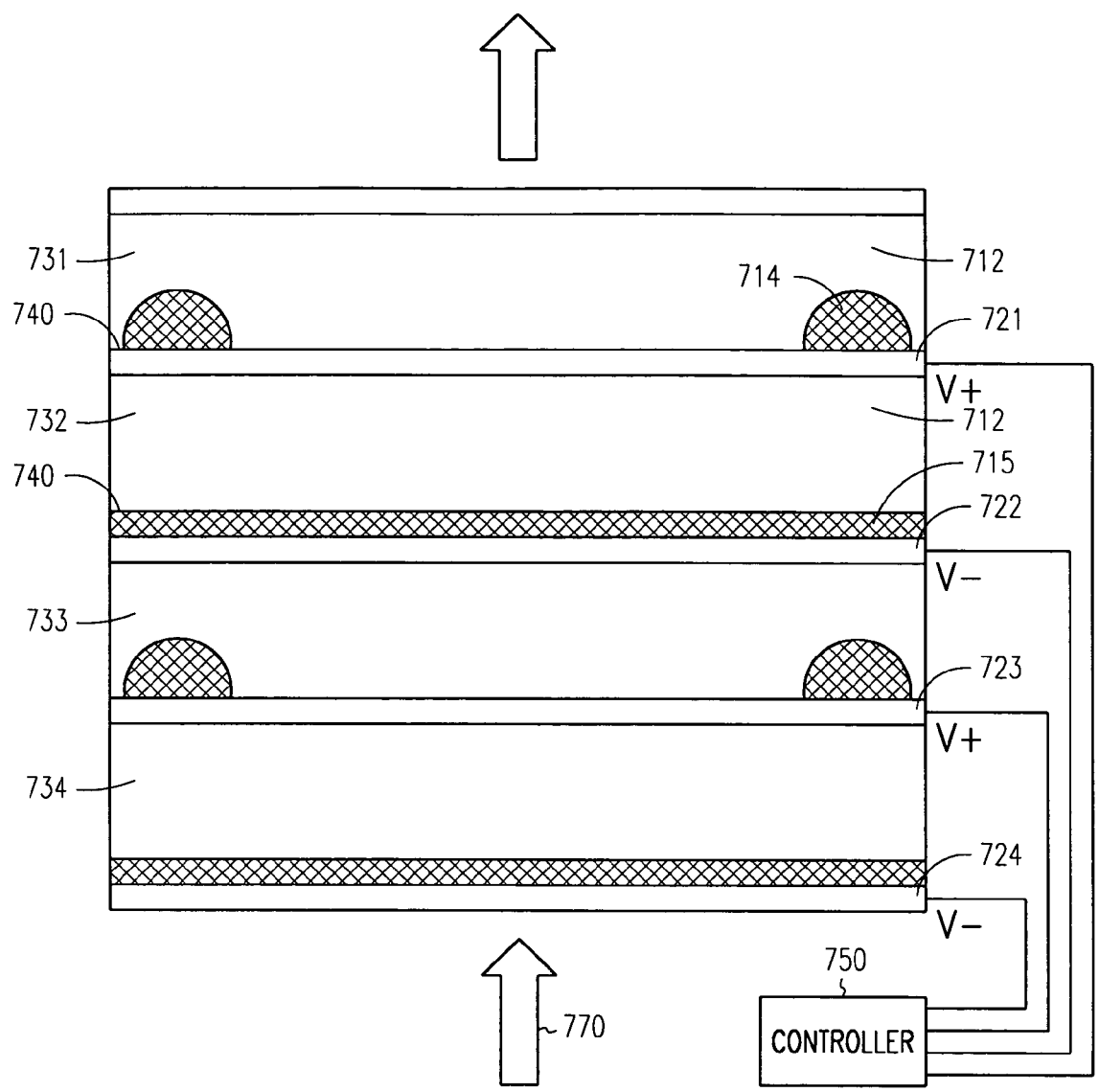
FIG. 7 is a schematic diagram of a spatial light generator that includes a plurality of stacked cells controlled by a controller, according to an example embodiment.

FIG. 7 is a schematic diagram of a spatial light modulator 700 that includes a plurality of stacked cells 731, 732, 733, 734 controlled by a controller 750, according to an example embodiment. A spatial light modulator 700 includes a first portion or cell 731 and a second portion or cell 732. The first portion or cell 731 includes a first planar electrode 721, a polar solvent 712, and a first non-polar solvent 714. The polar solvent 712 and the first non-polar solvent 714 cover the first planar electrode 721. A coating or film of molecules 740 is attached at one end to the first planar electrode 721. The molecules also have a free end or head. The free end or head is tethered to the first planar electrode 721 by a polymer chain. The molecules 740 change between a first conformation or shape and a second conformation or shape in response to a change in voltage on the first planar electrode 721.

The second portion or cell 732 includes a second planar electrode 722, the polar solvent 712, and a second non-polar solvent 715. The polar solvent 712 and the second non-polar solvent 715 cover the second planar electrode 722. A coating or film of molecules 740 is attached at one end to the second planar electrode 722. The molecules also have a free end or head. The molecules change between a first shape and a second shape in response to a change in voltage on the second planar electrode 722. The first portion or cell 731 is stacked on the second portion or cell 732. As shown in FIG. 7, the spatial light modulator 700 also includes a third portion or cell 733 and a fourth portion or cell 734. The third portion or cell 733 and the fourth portion or cell 734 are similarly constructed to the first cell or portion 731 and/or to the second cell or portion 732. A difference between the cells 731, 732, 733, 734 includes the colorant associated with either the polar solvent 712 or the non-polar solvent, in that each cell 731, 732, 733, 734 includes a different color. In one embodiment, the first color, the second color, the third color and the fourth color associated with the cells 731, 732, 733, 734, respectively, include cyan, yellow, magenta, and black. The first portion or cell 731, the second portion or cell 732, the third portion or cell 733, and the fourth portion or cell 734 are stacked with respect to one another.

Each of the cells 731, 732, 733, 734 is attached to the controller 750. The controller 750, in response to image data input, controls the voltage on each of the electrodes 721, 722, 723, and 724 to either place the colorized portion substantially in a light path through the stacked cells 731, 732, 733, 734 or substantially remove the colorized portion of the cells 731, 732, 733, 734 from a light path depicted by arrows 770 and 772. By controlling each cell 731, 732, 733, 734, a selected color of filtered light is output from the spatial light modulator 700. The spatial light modulator 700 also includes a light source (arrow 770) positioned to project light through the cells 731, 732, 733, 734. In some embodiments, a reflective surface (such as reflective surface 220 shown in FIG. 2) is positioned adjacent at least one of the first portion or cell, second portion or cell, third portion or cell, or fourth portion or cell.

Figure 8:
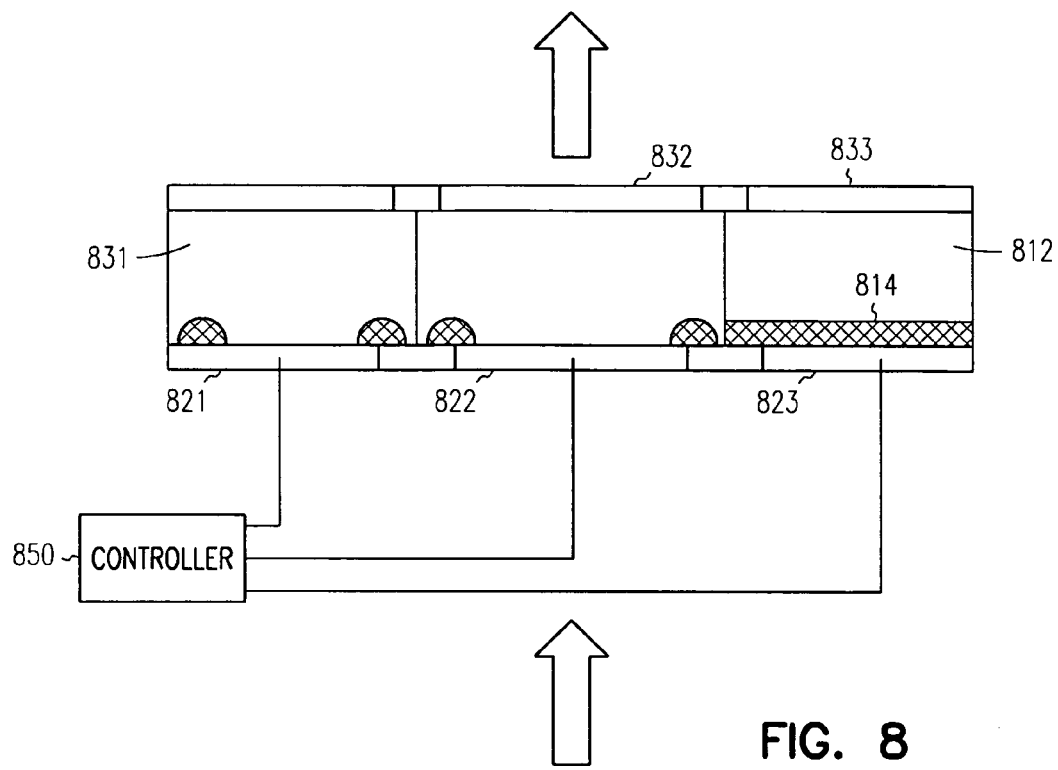
FIG. 8 is a schematic diagram of a spatial light generator that includes a plurality of adjacent cells controlled by a controller, according to an example embodiment.

FIG. 8 is a schematic diagram of a spatial light modulator 800 that includes a plurality of adjacent cells 831, 832, 833 controlled by a controller 850, according to an example embodiment. The spatial light modulator 800 includes a first portion or cell 831, a second portion or cell 832 and a third portion or cell 833. The first portion or cell 831 includes a first planar electrode 821, a polar solvent 812, and a first non-polar solvent 814. The polar solvent 812 and the first non-polar solvent 814 form localized concentrations of colorant 814 on the first planar electrode 821. A coating or film of molecules 840 is attached at one end to the first planar electrode 821. The molecules also have a free end or head (shown in FIGS. 4 and 6). The free end or head end is tethered to the first planar electrode by a polymer chain. The molecules 840 change between a first shape and a second shape in response to a change in voltage on the first planar electrode 821. The film or coating of molecules 840 changes between a hydrophobic or hydrophilic orientation with the change in shape. The hydrophobic or hydrophilic orientation causes either the colorized solvent to spread across the cell 831 to filter light passing through the cell, or concentrate within the cell 831 so that light passing through the cell 831 is uncolored. Each of the cells 832, 833 also includes an electrode 822, 823, respectively. Each of the cells 832 and 833 includes substantially the same structure as the cell 831. In cell 831, the colorized solvent is concentrated to allow most light to pass unfiltered. In cell 833, the colorized portion 814 is spread across a portion of the electrode 823. The difference between cells is that the colorized solvents in each of the cells 831, 832, 833 are a different color.

Each of the cells 831, 832, 833 is attached to a controller 850. The controller 850, in response to image data input, controls the voltage on each of the electrodes 821, 822, and 823 to either place the dyed portion substantially in a light path through the adjacent cells 831, 832, 833 or substantially remove the colorized portion of the cells 831, 832, 833 from the light path depicted as two arrows in FIG. 8. By controlling each cell 831, 832, 833, a selected color of filtered light is output from the spatial light modulator 800. A light source (not shown) is positioned to project light through the cells 831, 832, 833.

Figure 9:
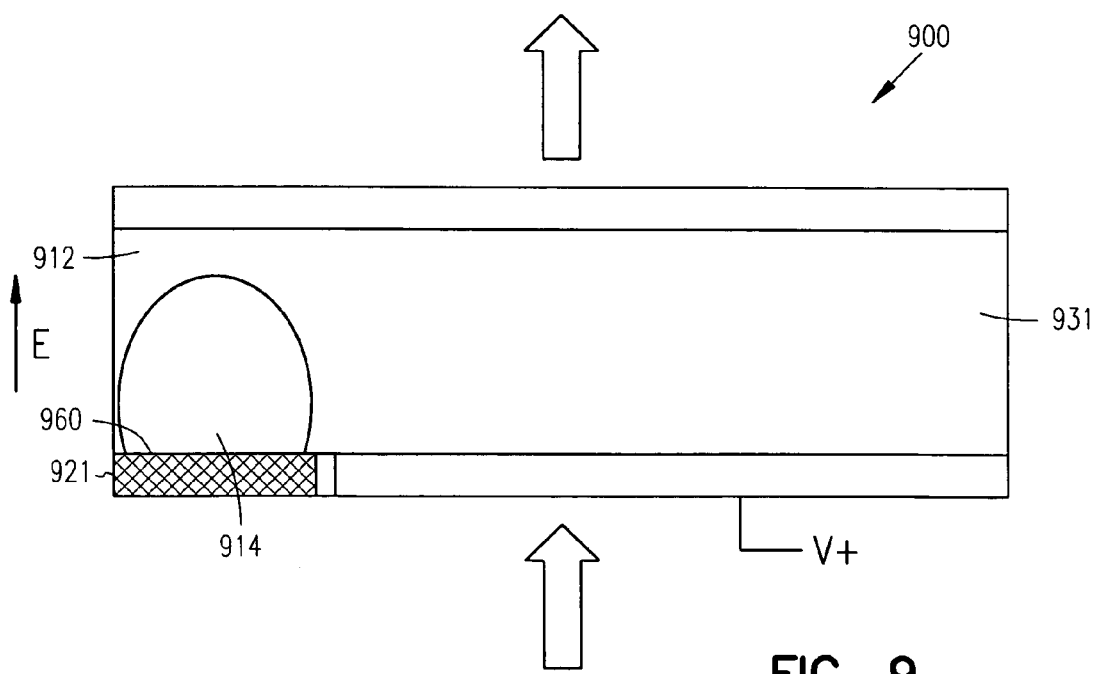
FIG. 9 is a schematic diagram of a cell that includes an area on the electrode free of the molecular monolayer, according to an example embodiment.

FIG. 9 is a schematic diagram of a cell that includes an area 960 on the electrode that is free of the molecular monolayer 400, according to an example embodiment. A cell 931 of the spatial light modulator 900, includes a planar electrode 921 covered by a polar solvent 912, and a non-polar solvent 914. The planar electrode 921 includes an area 960 of the planar electrode 921 that is devoid of a film or a coating of the molecular monolayer 400. The area 960, in some embodiments, is a patterned dewetting area. When the planar electrode 921 is charged so that the colorized portion of either the polar solvent 912 or the non-polar solvent 914 concentrates to allow light, depicted by two arrows, to pass through the cell 931 substantially unfiltered, the colorized portion is positioned on the area 960 of the planar electrode 921 that is devoid of a film or a coating of molecules.

Figure 10:
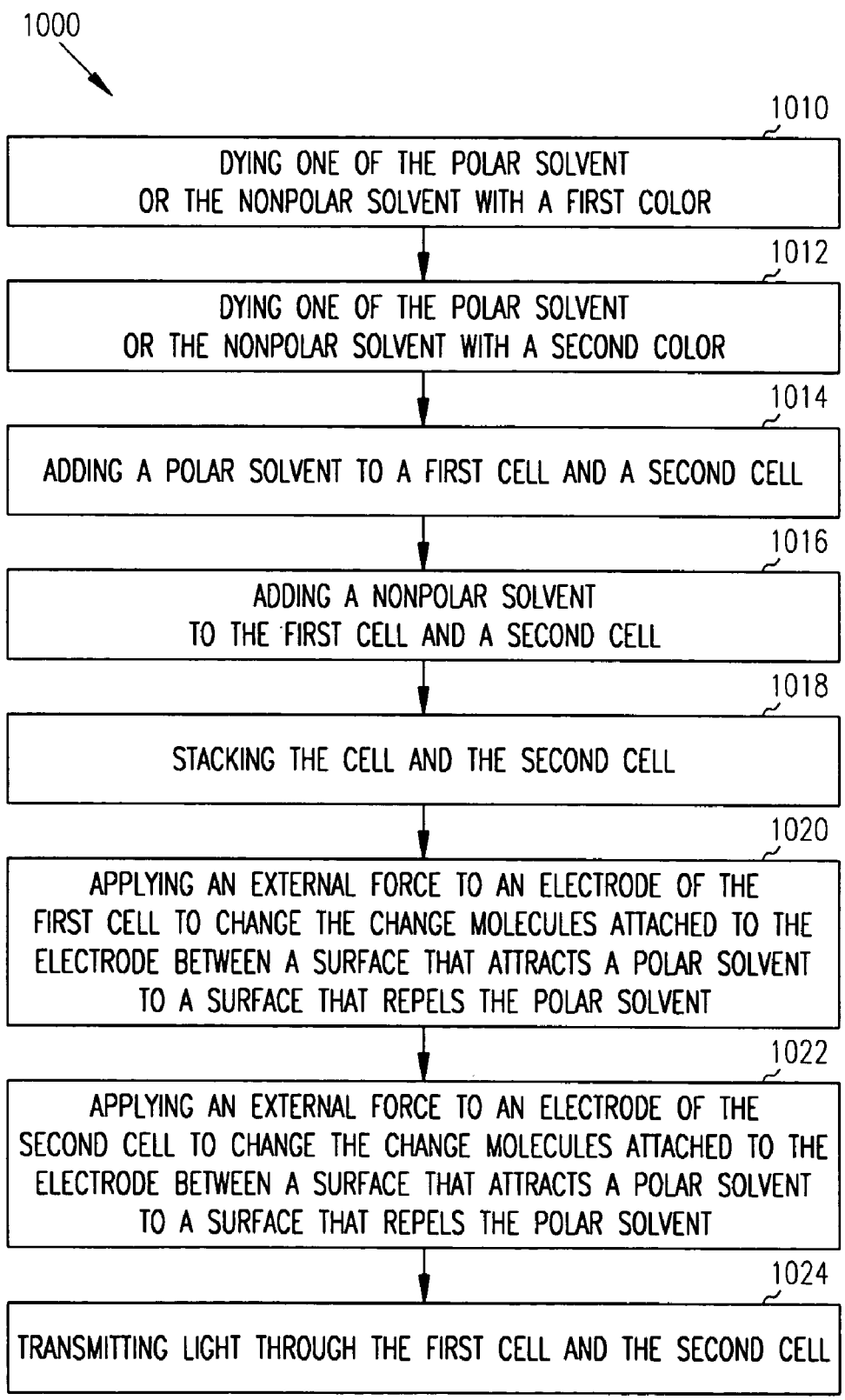
FIG. 10 is a flow diagram of a method, according to an example embodiment.

FIG. 10 is a flow diagram of a method 1000, according to an example embodiment. The method 1000 includes dying one of the polar solvent or the non-polar solvent in the first cell with a first color at block 1010, and dying one of the polar solvent or the non-polar solvent in the second cell with a second color at block 1012. The method 1000 also includes adding a polar solvent to a first cell and a second cell at block 1014, and adding a non-polar solvent to the first cell and a second cell at block 1016. The first cell and the second cell are stacked at block 1018. The method 1000 also includes applying an external force to an electrode of the first cell to change the change molecules attached to the electrode between a surface that attracts a polar solvent to a surface that repels the polar solvent at block 1020, and applying an external force to an electrode of the second cell to change the change molecules attached to the electrode between a surface that attracts a polar solvent to a surface that repels the polar solvent at block 1022. Applying the external force to one of the first cell or the second cell positions the colorized one of the non-polar solvent or polar solvent in a position across the cell. Applying the external force to one of the first cell or the second cell concentrates the colorized one of the non-polar solvent or polar solvent in a position within the cell. The method also includes transmitting light through the first cell and the second cell at block 1024. Removing an external force to the other of the first cell and the second cell causes the colorized portion of one of the first or second cell to be concentrated within the cell. In other words, applying the external force causes the colorized portion to be interposed in a light path traversing the cell. When an external force is not applied to the other of the first cell and the second cell, the colorized portion in the other of the first or second cell is concentrated in one area with respect to the other of the first or second cell. Light transmitted through the first cell and the second cell and the transmitted light is colored by the colorized portion extending across one of the first cell and the second cell.

Transmitting light through the first cell and the second cell, in some embodiments, includes reflecting the light transmitted through the first cell and the second cell. Applying an external force on the first cell and on the second cell includes controlling a voltage on the electrode of the first cell and on the electrode of the second cell.

A display includes a plurality of display elements capable of controlling light within a visible light spectrum. The display elements are positioned over a display surface. At least some of the display elements include a first portion that includes a first planar electrode, a polar solvent, and a first non-polar solvent. The polar solvent and the first non-polar solvent cover the first planar electrode. The first portion of the display element also includes a coating of molecules attached at one end to the first planar electrode. A free end of the molecules changes between a first shape and a second shape in response to a change in voltage on the first planar electrode. At least some of the display elements also include a second portion that includes a second planar electrode, a polar solvent, and a second non-polar solvent. The polar solvent and the second non-polar solvent cover the second planar electrode. A coating of molecules is attached at one end to the second planar electrode. Free ends of the molecular chains in the molecular layer change between a first shape and a second shape in response to a change in voltage on the second planar electrode. The display also includes a device for controlling the first portion and the second portion to control the light passing through the display element. In some embodiments of the display, the first portion is stacked on the second portion. The display also includes a plurality of receivers coupled to the plurality of display elements. The plurality of receivers is adapted to receive transmitted image information and activate the display elements in response to the image information. The device for controlling the first portion and the second portion controls at least some of the portions of the display elements in response to image information received at the receivers. The display also includes a light source for projecting light through the plurality of display elements. In some embodiments, the display further includes a reflective surface positioned near the plurality of display elements.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

The invention claimed is:

1. A spatial light modulator comprising:
   a first portion that includes:
      a first planar electrode;
      a polar solvent;
      a first non-polar solvent, wherein the polar solvent and the first non-polar solvent are supported by the first planar electrode; and
      a first coating of molecules attached at one end to the first planar electrode, wherein the first coating includes a free end changing between a first shape and a second shape in response to a change in voltage on the first planar electrode; and a second portion that includes:
a second planar electrode;
the polar solvent; and
a second non-polar solvent, wherein the polar solvent and the second non-polar solvent are supported by the second planar electrode; and
a second coating of molecules attached at one end to the second planar electrode, wherein the second coating includes a free end changing between the first shape and the second shape in response to a change in voltage on the second planar electrode.

2. The spatial light modulator of claim 1 wherein the first portion is stacked on the second portion.

3. The spatial light modulator of claim 1 wherein the first portion is adjacent the second portion.

4. The spatial light modulator of claim 1 wherein a portion of molecules of the first coating of molecules attracts the polar solvent when in the first shape and repels the polar solvent when in the second shape.

5. The spatial light modulator of claim 1 wherein one of the first non-polar solvent and the polar solvent includes a dye of a first color, and wherein one of the second non-polar solvent and the polar solvent includes a dye of a second color.

6. The spatial light modulator of claim 1 wherein one of the first non-polar solvent and the polar solvent includes a pigment of a first color, and wherein one of the second non-polar solvent and the polar solvent includes a pigment of a second color.

7. The spatial light modulator of claim 6 further comprising a third portion that includes:
a third planar electrode;
the polar solvent; and
a third non-polar solvent, wherein the polar solvent and the third non-polar solvent are supported by the third planar electrode; and
a third coating of molecules attached at one end to the third planar electrode, wherein the third coating of molecules includes a head end of the molecules changing between the first shape and the second shape in response to a change in voltage on the third planar electrode.

8. The spatial light modulator of claim 7 wherein the first portion, the second portion and the third portion are stacked with respect to each other.

9. The spatial light modulator of claim 7 wherein one of the first non-polar solvent and the polar solvent includes a pigment of a first color, and wherein one of the second non-polar solvent and the polar solvent includes a pigment of a second color, and wherein one of the third non-polar solvent and the polar solvent includes a pigment of a third color.

10. The spatial light modulator of claim 9 further comprising a light source positioned to project light through the first portion, the second portion and the third portion.

11. The spatial light modulator of claim 9 further comprising a reflective surface positioned adjacent at least one of the first portion, second portion or third portion.

12. The spatial light modulator of claim 6 further comprising a fourth portion that includes:
a fourth planar electrode;
the polar solvent;
a fourth non-polar solvent, wherein the polar solvent and the fourth non-polar solvent are supported by the fourth planar electrode; and
a fourth coating of molecules attached at one end to the fourth planar electrode, wherein the fourth coating includes a free end changing between the first shape and the second shape in response to a change in voltage on the fourth planar electrode.

13. The spatial light modulator of claim 12 wherein at least one of the first non-polar solvent and the polar solvent includes a pigment of a first color, and wherein one of the second non-polar solvent and the polar solvent includes a pigment of a second color, and wherein one of the third non-polar solvent and the polar solvent includes a pigment of a third color, and wherein one of the fourth non-polar solvent and the polar solvent includes a pigment of a fourth color.

14. The spatial light modulator of claim 13 wherein the first color, the second color, the third color and the fourth color include cyan, yellow, magenta, and black, respectively.

15. The spatial light modulator of claim 1 further comprising:
an area of the first planar electrode that is devoid of the first coating of molecules; and
an area of the second first planar electrode that is devoid of the second coating of molecules.

16. The spatial light modulator of claim 1 further comprising a lens positioned adjacent one of the first portion and the second portion.

17. A display device comprising:
a plurality of display elements capable of controlling light within a visible light spectrum, the plurality of display elements positioned over a display surface of the display, at least some of the display elements further comprising:
a first portion that includes:
a first planar electrode;
a polar solvent;
a first non-polar solvent, the polar solvent and the first non-polar solvent supported by the first planar electrode; and
a first coating of molecules attached at one end to the first planar electrode, the first coating including molecules having a free end changing between a first shape and a second shape in response to a change in voltage on the first planar electrode; and
a second portion that includes:
a second planar electrode;
a polar solvent; and
a second non-polar solvent, the polar solvent and the second non-polar solvent supported by the second planar electrode; and
a second coating of molecules attached at one end to the second planar electrode, the second coating including molecules having a free end changing between a first shape and a second shape in response to a change in voltage on the second planar electrode; and
means for controlling the first portion and the second portion to control the light passing through the display element.

18. The display device of claim 17 wherein the first portion is stacked on the second portion.

19. The display device of claim 18 further comprising a plurality of receivers coupled to the plurality of display elements and adapted to receive transmitted image information and activate the display elements in response to the image information.

20. The display device of claim 19 wherein the means for controlling the first portion and the second portion controls at least some of the portions of the display elements in response to image information received at the plurality of receivers.

21. The display device of claim 18 further comprising a light source for projecting light through the plurality of display elements.

22. The display device of claim 21 further comprising a reflective surface positioned near the plurality of display elements.

23. The display device of claim 21 wherein the light source is ambient light.

24. A system comprising:
- a display including plurality of display elements capable of controlling light within a visible light spectrum, the plurality of display elements positioned over a display surface of the display, at least some of the display elements further comprising:
  - a first portion that includes:
    - a first planar electrode;
    - a polar solvent;
    - a first non-polar solvent, the polar solvent and the first non-polar solvent supported by the first planar electrode; and
    - a first coating of molecules attached at one end to the first planar electrode, the first coating including molecules having a free end changing between a first shape and a second shape in response to a change in voltage on the first planar electrode; and
  - a second portion that includes:
    - a second planar electrode;
    - a polar solvent; and
    - a second non-polar solvent, the polar solvent and the second non-polar solvent supported by the second planar electrode; and
    - a second coating of molecules attached at one end to the second planar electrode, the second coating including molecules having a free end changing between a first shape and a second shape in response to a change in voltage on the second planar electrode; and
- a controller controlling the first portion and the second portion to control light passing through the display.

25. The system of claim 24 wherein the controller further comprises:
- a microprocessor; and
- a memory device coupled to the microprocessor.

26. The system of claim 24 further comprising image information, the controller controlling the first portion and the second portion in response to the image information.

* * * * *